April 18, 1967     A. D. GARWOOD ET AL     3,314,826
METHOD AND APPARATUS FOR SEALING CONTROLLED ATMOSPHERE
Filed Aug. 9, 1962
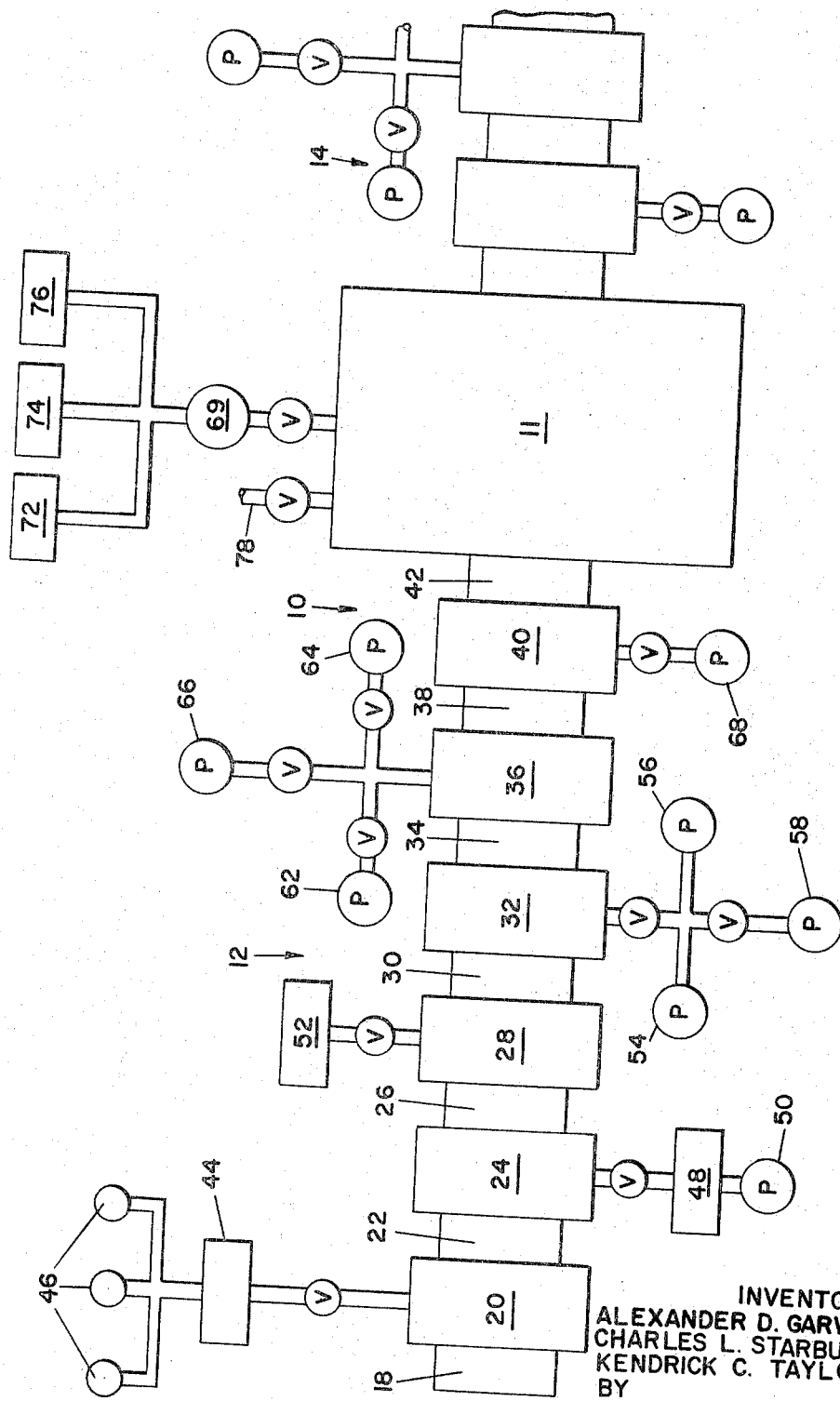
INVENTORS:
ALEXANDER D. GARWOOD
CHARLES L. STARBUCK
KENDRICK C. TAYLOR
BY
*Arthur H. Seidel*
ATTORNEY

United States Patent Office 3,314,826
Patented Apr. 18, 1967

3,314,826
METHOD AND APPARATUS FOR SEALING CONTROLLED ATMOSPHERE
Alexander D. Garwood, Riverton, N.J., and Charles L. Starbuck, Valley Forge, and Kendrick C. Taylor, Oreland, Pa., assignors, by mesne assignments, to Pennsalt Chemicals Corporation, Philadelphia, Pa., a corporation of Pennsylvania
Filed Aug. 9, 1962, Ser. No. 215,880
8 Claims. (Cl. 148—13)

This invention relates to a method and apparatus for sealing a controlled atmosphere.

The present invention may be utilized in conjunction with a variety of conventional industrial processes such as heat treatment, annealing, tin plating, vacuum deposition, etc. The particular industrial process is of secondary importance. The present invention is directed to the method and apparatus whereby material may be conveyed to a chamber having a controlled atmosphere therein and removed therefrom without contaminating the atmosphere.

For purposes of illustration, the present invention will be described in conjunction with apparatus for annealing endless strips of titanium having widths up to fifty inches and a thickness up to 0.1 inch. It is to be understood that the present invention may be utilized to process endless strips, sheets, wire, yarn, webs, etc. The apparatus and method are designed so that the processing portion of the apparatus may be provided with a controlled atmosphere subject to external contamination of less than one part per million.

The controlled atmosphere may be any one of a variety of atmospheres including high vacuum, atmospheric pressure, slight positive pressure such as ten inches of water, etc. The need for a sealing means and method to prevent external contamination is particularly necessary when the controlled atmosphere is a high vacuum. The present invention is adapted to be utilized in conjunction with a vacuum chamber having a pressure such as .1 micron. The present invention facilitates a controlled atmosphere at such pressures by providing an interstage chamber at a lower pressure such as .01 micron. The controlled atmosphere may include processing equipment which results in the generation of gases such as hydrogen, carbon monoxide, carbon dioxide, etc.

Means are provided for removing the generated gases within the controlled atmosphere if the same is desirable. However, the last mentioned means may also be utilized to introduce gases into the controlled atmosphere if desired.

In its simplest form, the present invention contemplates conveying material to be processed through a seal, into an interstage chamber, through a seal, into the processing chamber, through a seal, into an interstage chamber, through a seal, and reducing the pressure in the interstage chambers below the pressure in the processing chamber.

The seals are of a type which accommodate varying widths and thicknesses of materials with a minimum of leakage across the seals. Preferably, a plurality of sets of seals and interstage chambers are provided on the inlet and outlet side of the processing chamber. In this manner, the pressure drop across the various seals may be reduced in stages. If it was desired to maintain a processing chamber at a pressure of approximately .1 micron, and the pressure drop was to be taken across a single set of seals, the evacuation apparatus would be larger than the remainder of the equipment. Obviously, such an arrangement is not practical. Accordingly, smaller and more efficient equipment may be utilized when the pressure drop is reduced in stages.

It is an object of the present invention to provide a novel method and apparatus for processing material into and out of a controlled atmosphere.

It is another object of the present invention to provide means for conveying material into and out of a controlled atmosphere maintained at a pressure of approximately .1 micron without contaminating the controlled atmosphere.

It is another object of the present invention to provide a method and apparatus for maintaining the purity of a controlled atmosphere at a level of or less than one part per million.

It is another object of the present invention to provide a novel apparatus and method for annealing metal in strip form.

Other objects will appear hereinafter.

For the purpose of illustrating the invention there is shown in the drawings forms which are presently preferred; it being understood, however, that this invention is not limited to the precise arrangements and instrumentalities shown.

In the drawing there is disclosed a diagrammatic plan view of the apparatus of the present invention.

Referring to the drawing in detail, wherein like numerals indicate like elements, there is shown in FIGURE 1 an apparatus for maintaining the purity of a controlled atmosphere designated generally as 10.

The apparatus 10 includes a processing chamber 11 in which a variety of industrial processes such as vacuum deposition, annealing, etc., may be accomplished. The equipment for performing the particular process will be disposed within chamber 11 and is not illustrated since the same is conventional and forms no part of the present invention. The chamber 11 is provided with an inlet seal means 12 and an outlet seal means 14. The inlet and outlet seal means 12 and 14 are identical and a single seal means may be used as an inlet and outlet. Accordingly, only the inlet seal means 12 will be described in detail.

Material to be processed, which may be in strip form having widths up to fifty inches may be processed with the apparatus 10 of the present invention. The material at atmospheric pressure is conveyed by conventional apparatus (not shown) through inlet seal unit 18, interstage chamber 20, seal unit 22, interstage chamber 24, seal unit 26, interstage chamber 28, seal unit 30, interstage chamber 32, seal unit 34, interstage chamber 36, seal unit 38, interstage chamber 40, and through seal unit 42 into chamber 11.

Each of the seal units are identical and are preferably of the type disclosed in detail in copending application Ser. No. 219,238, filed on Aug. 21, 1962, by Raymond G. Frank, and entitled Rotary Seal, now Patent No. 3,170,-516. The disclosure in said application is incorporated herein by reference. In general, the seal units include a pair of tangent rollers. Each roller may be positively driven. The rollers are sealed with respect to their housing. The uppermost roller includes a plurality of discrete sections disposed side-by side within an elastic sleeve. Hence, only a minimum number of sections will be raised vertically to permit passage of material between the rollers thereby resulting in minimum leakage across the seal unit.

Interstage chamber 20 is coupled through a valved conduit to the inlet side of vacuum pump 44. The outlet side of vacuum pump 44 is coupled to the inlet side of backup rotary vacuum pumps 46. The inlet side of vacuum pump 48 is coupled through a valved conduit to interstage chamber 24. Vacuum pump 48 is provided with a rotary backup vacuum pump 50.

Interstage chamber 28 is coupled through a valved conduit to the inlet side of vacuum pump 52. Interstage chamber 32 is coupled to the inlet side of a pair of oil booster pumps 54 and 56. The pumps 54 and 56 are provided with a backup rotary pump 58. Interstage chamber 36 is coupled through a valved conduit to oil diffusion pumps 62 and 64. Pumps 62 and 64 are provided with a backup rotary pump 66. An oil diffusion pump 68 having a rotary backup pump is coupled to the interstage chamber 40.

The processing chamber 11 is coupled through a valved conduit to an oil diffusion pump 69. Pump 69 is provided with backup vacuum pumps 72, 74 and 76. Valved conduit 78 is in communication with chamber 11 to facilitate introduction of inert or active gases and the like. Other apparatus of a conventional nature such as electrical conduits, water cooling conduits, gauges, etc. which are associated with the chamber 11 are not illustrated since the same are conventional and form no part of the present invention.

The various types and arrangement of pumps described above and associated with the various interstage chambers are an example of a working embodiment. The variety of pumps is necessitated by the requirement that each pump be the most efficient at the pressure in the various interstage chambers. A working embodiment may include the following pressures at the various interstage chambers: Chamber 20, 50 millimeters; chamber 24, one millimeter; chamber 28, 50 microns; chamber 32, one micron; chamber 36, 0.05 micron; chamber 40, 0.01 micron, and chamber 11, 0.1 micron.

It will be noted that the pressure in chamber 40 is lower than the pressure in chamber 11 and any of the above interstage chambers. Since the pressure in chamber 40 is lower than the pressure in chamber 11, any contaminant gases on the material being conveyed to the chamber 11 through chambers 20, 24, 28, 32, and 36 cannot enter chamber 11 from chamber 40. In the illustrated embodiment, the pressure in chamber 11 is ten times as great as the pressure in chamber 40. Any pressure ratio between three and twenty is considered practical. Pressure ratios beyond twenty become impractical and are unnecessary.

Any gases generated in chamber 11 due to the annealing process will be removed by pump 69. For example, hydrogen is generated when annealing titanium. A small amount of such hydrogen will leak past the seal unit 42 and be removed by pump 68. Since the closest interstage chamber to the chamber 11, namely chamber 40, is at a pressure which is substantially lower than the pressure in chamber 11, the annealing process can be accomplished in chamber 11 with a purity or freedom from external gaseous contamination less than one part per million.

The material to be processed in chamber 11 may be conveyed into and out of this chamber by a wide variety of conveyor devices. A conveyor means which pushes and/or pulls the strip material through the seal units, interstage chambers and chamber 11 is preferred since the seal units need not be designed to accommodate an external conveyor. The rollers in each seal unit support intermediate portions of the material at spaced points therealong. Rollers or other guides will be provided in the chamber 11.

The present invention may be embodied in other specific forms without departing from the spirit or essential attributes thereof and, accordingly, reference should be made to the appended claims, rather than to the foregoing specification as indicating the scope of the invention.

It is claimed:
1. A method of conveying material into and out of a controlled atmosphere comprising the steps of conveying material to be processed through a seal into an interstage chamber, conveying the material from said interstage chamber through a second seal into a processing chamber, processing the material while it is in said processing chamber, conveying the material from said last mentioned chamber through a seal into a second interstage chamber, conveying the material from said last mentioned interstage chamber through another seal, and reducing the pressure in said interstage chambers below the pressure within said processing chamber, whereby the atmosphere in the process chamber may be free from external contamination due to conveyance of the material into and out of the process chamber.

2. A method in accordance with claim 1 including annealing the material while it is in said process chamber.

3. A method in accordance with claim 1 including evacuating said process chamber.

4. A method of conveying material into and out of a controlled atmosphere in a manner so that the controlled atmosphere may be operated without external contamination at a rate of at least one part per million comprising the steps of conveying material to be processed through first, second and third sets of a seal unit and interstage chamber in that sequence, conveying the material to be processed from said third interstage chamber through a seal unit into a processing chamber, processing the material within said last mentioned chamber, conveying the material from said last mentioned chamber through fourth, fifth and sixth sets of a seal unit and interstage chamber, sequentially reducing the pressure in each interstage chamber so that the pressure in the third and fourth interstage chambers is less than the pressure in any of the remaining chambers, and controlling the atmosphere within said processing chamber.

5. A method in accordance with claim 4 wherein the step of reducing the pressure in the interstage chamber is accomplished in a manner so that the pressure in the second and fifth chambers is less than the pressure in the first and sixth chambers, and the pressure in the first, second and third chambers being reduced by different types of pumps so that the most efficient pump is utilized at the desired pressure level of the various interstage chambers.

6. Apparatus comprising a processing chamber, inlet and outlet means for said chamber, said inlet and outlet means including a pair of seal units on opposite sides of an interstage chamber, said interstage chamber being in direct communication with said processing chamber through one of said seal units, means for controlling the atmosphere within said processing chamber, and a pumping means coupled to said interstage chamber for reducing the pressure in said interstage chamber below the pressure in said processing chamber, whereby the controlled atmosphere within said processing chamber may be maintained free from external contaminates at a level of one part per million.

7. Apparatus in accordance with claim 6 wherein said means for controlling the atmosphere in said processing chamber includes a diffusion pump for evacuating said processing chamber, and said processing chamber having means for annealing strip material adapted to be conveyed therethrough.

8. Apparatus in accordance with claim 6 wherein said inlet means includes a plurality of sets of seal units and interstage chambers, and means for evacuating each interstage unit in a manner so that the first mentioned interstage chamber is maintained at a pressure lower than each of the chambers.

References Cited by the Examiner
UNITED STATES PATENTS

| | | | |
|---|---|---|---|
| 890,314 | 6/1908 | Thompson | 266—3 X |
| 1,646,498 | 10/1927 | Seede | 266—3 |
| 1,987,577 | 1/1935 | Moers | 266—3 |
| 2,775,825 | 1/1957 | Phillips | 263—3 X |
| 2,890,878 | 6/1959 | Steinherz et al. | 266—3 |
| 3,020,032 | 2/1962 | Casey | 263—3 X |

DAVID L. RECK, *Primary Examiner.*

DELBERT E. GANTZ, *Examiner.*

R. O. DEAN, *Assistant Examiner.*